United States Patent [19]

Shiau et al.

[11] Patent Number: 5,293,430
[45] Date of Patent: Mar. 8, 1994

[54] AUTOMATIC IMAGE SEGMENTATION USING LOCAL AREA MAXIMUM AND MINIMUM IMAGE SIGNALS

[75] Inventors: Jeng-Nan Shiau, Webster; Barbara L. Farrell, Fairport, both of N.Y.

[73] Assignee: Xerox Corporation, Stamford, Conn.

[21] Appl. No.: 4,479

[22] Filed: Jan. 12, 1993

Related U.S. Application Data

[63] Continuation of Ser. No. 722,568, Jun. 29, 1991, abandoned.

[51] Int. Cl.$^5$ .............................................. G06K 9/36
[52] U.S. Cl. .......................................... 382/42; 382/9; 382/53; 358/455; 358/464
[58] Field of Search .................... 382/9, 42, 52, 53; 358/455, 456, 458, 462, 464

[56] References Cited

U.S. PATENT DOCUMENTS

| | | | |
|---|---|---|---|
| 3,294,896 | 12/1966 | Young, Jr. | 358/283 |
| 4,194,221 | 3/1980 | Stoffel | 358/283 |
| 4,251,837 | 2/1981 | Janeway, III | 358/283 |
| 4,509,195 | 4/1985 | Nadler | 382/51 |
| 4,547,811 | 10/1985 | Ochi et al. | 358/283 |
| 4,556,918 | 12/1985 | Yamazaki et al. | 358/283 |
| 4,559,563 | 12/1985 | Joiner, Jr. | 358/283 |
| 4,578,714 | 3/1986 | Sugiura et al. | 358/283 |
| 4,729,035 | 3/1988 | Tanioka | 358/282 |
| 4,730,221 | 3/1988 | Roetling | 358/283 |
| 4,736,253 | 4/1988 | Shida | 358/283 |
| 4,811,115 | 3/1989 | Lin et al. | 358/283 |
| 4,853,792 | 8/1989 | Katsuta et al. | 358/455 |
| 5,018,024 | 5/1991 | Tanioka | 358/457 |
| 5,025,481 | 6/1991 | Ohuchi | 382/53 |

FOREIGN PATENT DOCUMENTS

| | | |
|---|---|---|
| 0158155 | 7/1991 | European Pat. Off. |
| 2153619 | 8/1985 | United Kingdom |

Primary Examiner—David K. Moore
Assistant Examiner—Andrew W. Johns
Attorney, Agent, or Firm—Mark Costello

[57] ABSTRACT

Method and apparatus for processing image pixels to determine the presence of high frequency halftone images. Prior to auto correlation, each pixel in the image is examined to determine whether it is a local area maximum or minimum. A binary image function composed of the image local area maximum or minimums is made available for auto correlation. The presence of peaks at shifts indicative of predetermined halftone image frequencies is detected, and an output signal indicative of the presence or absence of peaks at the predetermined halftone image frequencies is provided. The arrangement is combined with a run length encoder to reduce false microdetection results.

21 Claims, 8 Drawing Sheets

```
              SHIFT
           0 1 2 3 4 5 6 7 8 9 10
           2 0 0 0 0 0 0 2 0 0 0
           2 0 0 0 0 0 0 2 0 0 0
           5 0 2 0 1 2 2 3 1 1 0
           1 0 0 0 0 0 0 0 0 0 0
           1 0 0 0 0 0 0 0 0 0 0
SCAN LINE  2 0 0 0 0 0 0 1 0 0 0
           2 0 0 0 0 0 0 2 0 0 0
           0 0 0 0 0 0 0 0 0 0 0
           2 0 0 0 0 0 0 2 0 0 0
           4 0 1 0 0 2 1 2 1 0 0
           2 0 0 0 0 0 0 2 0 0 0
           2 0 0 0 0 0 1 1 0 0 0
           5 0 3 0 0 2 0 4 1 2 0
           0 0 0 0 0 0 0 0 0 0 0
           1 0 0 0 0 0 0 0 0 0 0
           3 0 1 0 0 1 0 3 0 2 0
```

FIG. 3F

```
x    xx    XXXXXXX        XXXXXXXX         XXXX
           XXXXXXX                         XXXXX
           XXX   XXX      XXX XXXXX        XXXXXX
           XXXXXXXX                        XXXXX
           XXXXXX XXX                      XXX
           XXX XXXXXX
```

AUTOMATIC IMAGE SEGMENTATION USING LOCAL AREA MAXIMUM AND MINIMUM IMAGE SIGNALS

This is a continuation of application Ser. No. 07/722,568, filed Jun. 27, 1991 abandoned.

The present invention relates generally to a system for processing image pixels, and more particularly to the detection of halftone frequency prior to processing.

INCORPORATION BY REFERENCE

U.S. Pat. No. 4,194,221 to Stoffel and U.S. Pat. No. 4,811,115 to Lin et al. are herein incorporated by reference for their teachings.

BACKGROUND OF THE INVENTION

In the reproduction of copies of an original from video image data created, for example, by electronic raster input scanning from an original document, one is faced with the limited resolution capabilities of the reproducing system and the fact the output devices, are mostly binary. This is particularly evident when attempting to reproduce halftones, lines and continuous tone images. Of course, an image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of high frequency halftones, low frequency halftones, continuous tones, or line copy, or a combination, in some unknown degree, of some or all of the above. In the face of these possibilities, optimizing the image processing system for one image type in an effort to offset the limitations in the resolution capability of the reproducing apparatus used, may not be possible, requiring a compromise choice which may not produce acceptable results. Thus, for example, where one optimizes the system for low frequency halftones, it is often at the expense of degraded reproduction of high frequency halftones, or of line copy, and vice versa.

In U.S. Pat. No. 4,194,221 to Stoffel, this problem was addressed by applying a discrimination function instructing the image processing system as to the type of image data present and particularly, an auto correlation function to the stream of pixel data, to determine the existence of halftone image data. Such a function is expressed as:

$$A(n) = \sum_{t=0}^{t=\text{last}} p(t) \times p(t + n) \quad (1)$$

where
n = the bit or pixel number;
p = the pixel voltage value; and
t = the pixel position in the data stream.

Stoffel describes a method of processing automatically a stream of image pixels representing unknown combinations of high and low frequency halftones, continuous tones, and/or lines to provide binary level output pixels representative of the image. The described function is applied to the stream of image pixels and, for the portions of the stream that contained high frequency halftone image data, notes a large number of closely spaced peaks in the resultant signal. The correlator circuits described in Stoffel's embodiment, however, are very expensive, as they must provide a digital multiplication function. Accordingly, as a practical matter, Stoffel requires as a first step, reduction of the amount of data handled, by initially thresholding image data against a single threshold value, to reduce the image to a high contrast black or white image. However, depending on the selection of the threshold as compared to the intensity of the image, significant amounts of information may be lost in the thresholding process. For example, if the threshold level is set to distinguish in the middle of the intensity range, but the image has significant variations through the darker gray levels, the thresholded result does not indicate the variations. This results in an undesirable loss of image information. While it may be possible to vary the threshold value adaptively from original to original and from image area to image area, such algorithms tend to be complicated and work well only for a restricted class of images such as line images. In U.S. Pat. No. 4,811,115 to Lin et al, the auto correlation function is calculated for the stream of halftone image data at selected time delays which are predicted to be indicative of the image frequency characteristics, without prior thresholding. The arithmetic function used in that auto correlation system is an approximation of the auto correlation function using logical functions and addition, rather than the multiplication function used in U.S. Pat. No. 4,194,221 to Stoffel. Valleys in the resulting auto correlated function are detected to determine whether high frequency halftone image data is present.

GB 2,153,619A provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image. The thresholding step in this method has the same undesirable effect as described for Stoffel.

Of background interest in this area are U.S. Pat. No. 4,556,918 to Yamazaki et al. showing an arrangement assuming a periodicity of an area of halftone dots which are thresholded against an average value derived from the area to produce a density related video signal; U.S. Pat. No. 4,251,837 to Janeway, III. which shows the use of a three decision mode selection for determining threshold selection based on gradient constants for each pixel; U.S. Pat. No. 4,578,714 to Sugiura et al. which shos random data added to the output signal to eliminate pseudo-outlines; U.S. Pat. No. 4,559,563 to Joiner, Jr. suggests an adaptive prediction for compressing data based on a predictor which worked best for a previous pixel block; and U.S. Pat. No. 3,294,896 to Young, Jr. teaches the usefulness of thresholding in producing an image from a binary digital transmission system.

U.S. Pat. No. 4,509,195 to Nadler describes a method for binarization of a pattern wherein two concentric rings around a pixel are evaluated to determine contrast values, and the contrast values are used then to determine whether the pixel and the surrounding areas have a light or dark quality. U.S. Pat. No. 4,547,811 to Ochi et al. teaches a method of processing gray level values, depending on the density level of blocks of pixels, and their difference from a minimum or maximum value. The blocks are then processable by a halftone processing matrix depending on the difference value, U.S. Pat.

No. 4,730,221 to Roetling discloses a screening technique where values of gray over an image are evaluated to determine a minimum and maximum level, in order to determine constant levels of gray. U.S. Pat. No. 4,736,253 to Shida discloses a method of producing a halftone dot by selectively comparing image signals with highlight and shadow reference values, for determination of the binarization process.

A particular problem noted in the use of the auto correlation function is the false characterization of a portion of the image as a halftone, when in fact it would be preferable for the image to be processed as a line image. Examples of this defect are noted particularly in the processing of Japanese Kanji characters and small Roman letters. In these examples, the auto correlation function may detect the image as halftones and process accordingly, instead of applying a common threshold through the character image. The described computations of auto correlation are one dimensional in nature, and this problem of false detection will occur whenever a fine pattern that is periodic in the scan line or fast scan direction is detected. In the same vein, shadow areas and highlight areas are often not detected as halftones, and are then processed with the application of a uniform threshold.

Another similar problem is in the detection of color halftones, which typically include the superposition of plural separations of image data, at selected frequencies, but having the screens processed at angles with respect to each of the other screens. Accordingly, the response obtained after auto correlation is not the same as a response from a black and white image having a single screen frequency.

SUMMARY OF THE INVENTION

In accordance with the invention there is provided a method and apparatus for applying the auto correlation function for the determination of the presence of high frequency halftone image data, which improves detection of halftones.

In accordance with one aspect of the invention, for each pixel in a stream of image data, that pixel is compared to a predetermined group of neighbors, to establish whether that pixel is a minimum or maximum value with respect to the neighbors. A pattern or function is derived representative of those pixels which are local minima, and of those pixels which are local maxima. To this function, the auto correlation function is applied with a delay or offset selected to determine whether the halftone is a high or low frequency.

In accordance with another aspect of the invention, the resultant minima or maxima functions can be represented as a simple series of 1's and 0's, where the 1's representing the minima or maxima, depending on which function is being examined. Accordingly, the calculation of the auto correlation function is greatly simplified, and can be represented by a simple logical AND function.

In accordance with yet another aspect of the invention, once the function representing the local area minima or maxima has been derived, if the auto correlation function is applied with a zero offset value, a determination of the presence of color halftones may be made.

In accordance with still another aspect of the invention, there is provided a method of processing image pixels in an image to determine the presence of halftone images, the steps comprising:

for each pixel in the image, comparing said pixel to each of its neighbors to determine whether it is a local area minimum or maximum;

from said determination step, deriving two image signals, a first image signal representing local area maximums of the image, and a second image signal representing local area minimums of the image;

measuring image density over a block of T pixels with respect to a reference;

auto correlating the first image signal if measured image density is relatively high with respect to the reference, or auto correlating the second image signal if measured image density is relatively low with respect to the reference, the auto correlation function evaluated over the block of T pixels, and for each of a plurality of offset values selected as corresponding to probable halftone frequencies;

from the auto correlated image signal, determining for each offset value whether the result of the auto correlation function evaluation is a zero or non-zero value, the presence of a non-zero value indicating the presence of halftone images at the frequency corresponding to the offset value.

In one embodiment of the aforementioned method, the auto correlation function A(n) is given by:

$$A(n) = \sum_{t=0}^{T} p(t) \times p(t+n)$$

where
n is a selected offset of the auto correlation function;
p is the pixel value; and
t = a pixel position in the block of T pixels selected.

In accordance with yet another aspect of the invention, there is provided a method of determining whether to process an image area in accordance with a halftone image processing method, the steps comprising:

for each block of T pixels within the image area, determining whether said block represents halftones images;

for each positive determination within a selected area, increasing a count of halftone blocks, and for each negative within the selected area, decreasing the count of halftone blocks;

using said determination count, to generate a weighting factor, said weighting factor indicative of the probability of a particular block of pixels representing halftone images;

irrespective of the determination of whether said block represents halftones images, providing an indication of the block of pixels as representing halftones images when the weighting factor is greater than a preselected value.

These and other aspects of the invention will become apparent from the following description used to illustrate a preferred embodiment of the invention read in conjunction with the accompanying drawings in which:

FIG. 5A shows an image wherein halftones have been micro detected, while

Image data in the form of video image data picture elements, (hereinafter, pixels), which may be either analog or digital voltage representations of the image, is provided from a suitable source. For example, the image data pixels may be obtained through line by line scanning of an image bearing original by one or more photosensitive element, such as a multiple photosite array of charge coupled devices, commonly referred to as CCD's. Line by line scanning of an image bearing original for the derivation of image data is well known and does not form a part of the present invention.

In content, the original may be composed entirely of lines, or low frequency halftone image(s), or high frequency halftone image(s), or continuous tone image(s), or combinations thereof. Where the original consists of lines, as for example a typed page, the image pixels may be converted to either one of two voltage levels, one representing non-image or background areas and the other image areas.

A continuous tone image comprises an unscreened image, typically a photograph. When scanned, the voltage values of the pixels produced are representative of the gray levels making up the picture.

A halftone image, typically a picture or scene, is one which has been reproduced through a screening process. One example is a newspaper picture. The screen used may be either a high or low frequency screen. A high frequency screen is arbitrarily defined herein as one having a frequency of 100 cycles per inch or more, while a low frequency screen is defined as one having a frequency less than 100 cycles per inch. Halftone images, therefore, comprise a pattern of discrete dots, the frequency of which depends upon the screening frequency used.

With reference now to the drawings where the showings are for the purpose of illustrating a preferred embodiment of the invention and not for limiting same, in an application incorporation the present invention, such as that described, for example, in U.S. Pat. No. 4,194,221 to Stoffel, FIG. 1 demonstrates handling of image data, which may be derived from any number of sources, including a raster input scanner, a graphics workstation, an electronic memory or other storage element, etc. The stream of image pixels from an image data input is fed to a data buffer 20. Buffer 20, which comprises any suitable commercially available serial in/serial out multi-row buffer having a bit storage capacity sufficient to temporarily store lines of image pixels, permits processing of image data in blocks of several lines.

Figure 1:
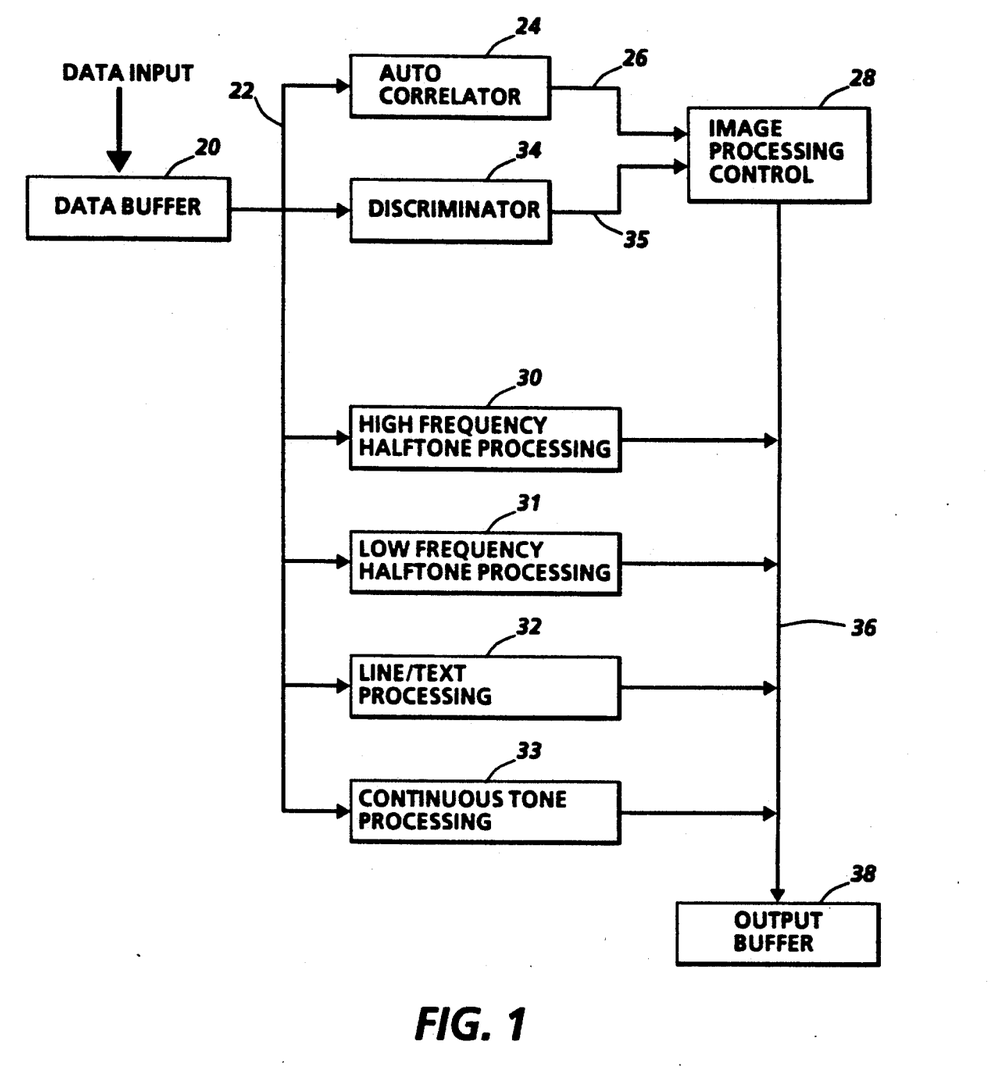
FIG. 1 demonstrates a block diagram of an image data processing system wherein the present invention finds particular use.

Image data is made available to the image processing system along data bus 22. Image data at this point is in its raw gray format, for example, 6-8 bits per pixel. To detect the presence of high frequency halftone image data, a one dimensional block of image pixels is unloaded from buffer 20 onto a data bus 22. The block of image pixels is passed to halftone detector 24 which as will be explained herein below, auto correlates each pixel group in accordance with a predetermined algorithm to determine if the image data contains halftones or not. An output on line 26 instructs the image processing control 28 to handle the data in accordance with whether high or frequency halftone image data has been detected. A suitable block size is 16 pixels at a time at 400 spots/inch, or 12 pixels at a time at 300 spots/inch. Too large a sample size has a tendency to cause a blurred result, while too small a sample size does not contain a large enough amount of data for a good sample of the function. Either case results in inaccuracies in detecting halftone image data.

The presence of line copy and/or continuous tone data is determined by discriminator 34. Discriminator 34 functions to produce an output on line 35 indicative of the presence of line copy or continuous tone image data, instructing image processing control 28 to handle data in accordance therewith.

Image processing control 28 serves essentially as a switch to allow data from the image processing sections, including high frequency halftone processing section 30, low frequency halftone processing 31 and line image processing section 32 and continuous tone processing section 34, to flow through bus 36 to an output buffer 38 in accordance with the detection of data in the particular mode. Image processing control 28 controls data bus 36 to allow data flow from each processing section, in accordance with the signals passed thereto from halftone detector 24 or discriminator 34. Each processing section processes all image data in accordance with its function, but only that data appropriately processed is allowed to pass to the output buffer 38. Data improperly processed is discarded.

Figure 2:
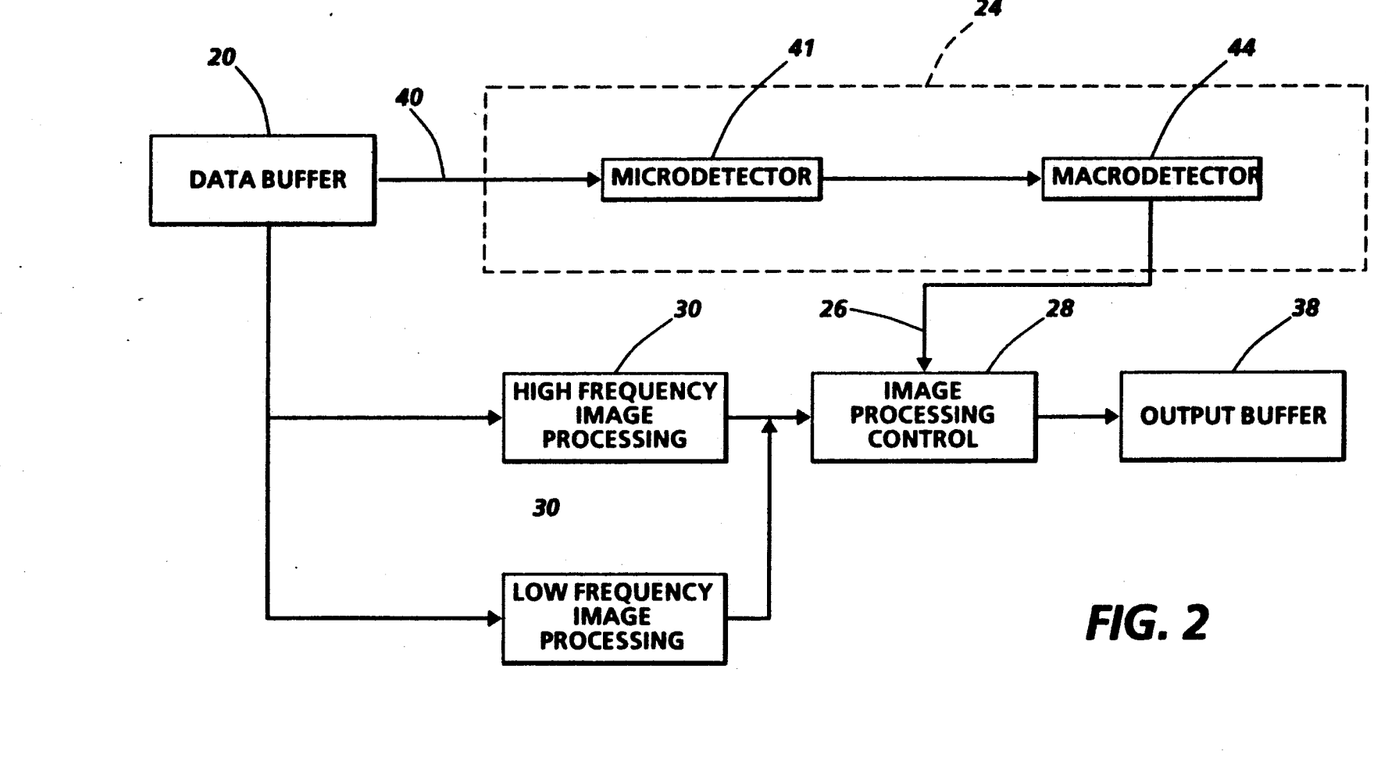
FIG. 2 is a block diagram of the main system elements of the auto correlator of FIG. 1

With reference now to FIG. 2, the halftone detector broadly includes two sections. Microdetector 41 operates to detect and establish discrete spans of detected halftone pixels. Macrodetector 44 operates to join detected halftones into continuous regions. A signal from macrodetector 44 establishes the image processing method with which image processing control 28 handles the image data.

Figure 3A:
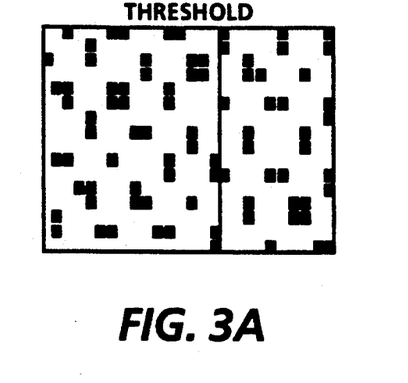
FIGS. 3A, 3B and 3C demonstrate an example of the process of generating the video minimum and maximum functions, and the results of the application of the auto correlation function on the video minimum and maximum functions for a monochrome image.
Figure 3B:
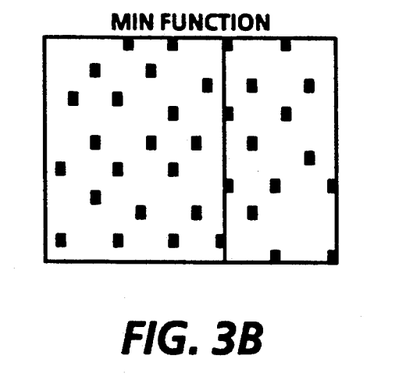

With reference now to FIGS. 3A and 3B, which represent operation in accordance with the invention on a highlight area of a 26 pixel by 20 scan line image portion, including a 120 line per inch (lpi), 45° halftone scanned at 400 spi in each direction. FIG. 3A shows a portion of an image, which for illustration purposes, has been previously thresholded, although this is not a requirement of the invention. Each pixel $V_{i,j}$, where the index i refers to scanlines, and the index j refers to pixels in a scan line, is then compared with a preselected group of neighbors, in this case 8 adjacent pixels, and their average value $Avg_{i,j}$. Pixel $V_{i,j}$ is determined to be a maximum if the gray level value of the pixel is greater than all 8 of the neighboring bits. In a preferred arrangement, to be declared a maximum, pixel $V_{i,j}$ must also be greater than the neighborhood average by a predefined noise margin. Pixel $V_{i,j}$ is likewise declared a minimum if $V_{i,j}$ is less than all of the neighboring pixels, and also is less than the neighborhood average by a predefined noise margin. In the described example, the noise margin is 8 levels, out of 0-255 levels. The results of this step are minima and maxima functions, having one bit per pixel patterns, shown in FIG. 3B. The periodic nature of the halftone becomes much more apparent when the local area minima/maxima function is taken, as shown in FIG. 3B. A running average of the video is kept over the area to determine whether the image is relatively light or dark. In accordance with this determination, the minima function is used when the image is relatively light, and the maxima function is used when the image is relatively dark. The selected pattern (in this case, a minima pattern) is then used to compute the auto correlation function, given by $$A(n) = \sum_{t=0}^{t=\text{last}} p(t) \times p(t+n) \quad (1)$$

where n = a selected offset or time delay of the auto correlation;
p = the pixel voltage value; and
t = the pixel position in the data stream.

Figure 3C:
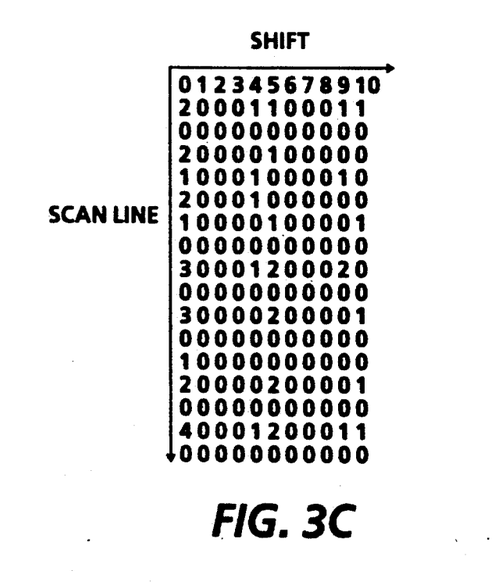

The approximate auto correlation function of U.S. Pat. No. 4,811,115 to Lin et al. may be used, given by $$\Phi(k) = \sum_{l=1}^{L} |f(l) - f(l+k)|;$$

where k is a selected time delay along the function,
f(l) is the pixel intensity value, and
l is a selected pixel position in the data stream;

However, the one bit video max/min function upon which the auto correlation function operates is now greatly simplified over the requirements noted by U.S. Pat. No. 4,811,115 to Lin et al., and the standard auto correlation function described by Stoffel may be used. The auto correlation function can be treated as a logical AND operation operable on the image data. FIG. 3C, then shows the results of the auto correlation function for blocks of 16 pixels at 11 offsets, (n=0, 1, 2, ... 10) for each scan line. Non-zero entries are found at shifts 4, 5 and 9, 10, corresponding to the projected wavelength and multiples of the 45° halftone.

The following is a chart showing some common halftone screen frequencies and the probable image shift positions at which non-zero entries will be noted for auto correlation at 400 spi.

| Screen Frequencies @ 45° in lpi | Screen Frequencies @ 0° in lpi | Screen Period @ 0°, in Pixels | Shift for Auto Correlation Peaks |
|---|---|---|---|
| 65 | 46 | 8.7 | 8–9 |
| 85 | 60 | 6.7 | 6–7 |
| 100 | 71 | 5.7 | 5–6 |
| 110 | 78 | 5.1 | 5 |
| 120 | 85 | 4.7 | 4–5 |
| 133 | 94 | 4.3 | 4 |
| 150 | 106 | 3.8 | 3–4 |
| 175 | 124 | 3.2 | 3 |

Figure 3D:
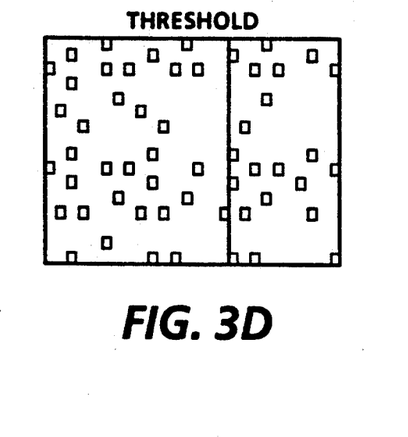
FIGS. 3D, 3E, and 3F demonstrate a similar example for a polychrome image.
Figure 3E:
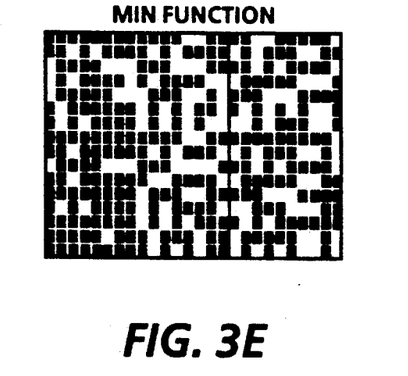
Figure 3F:
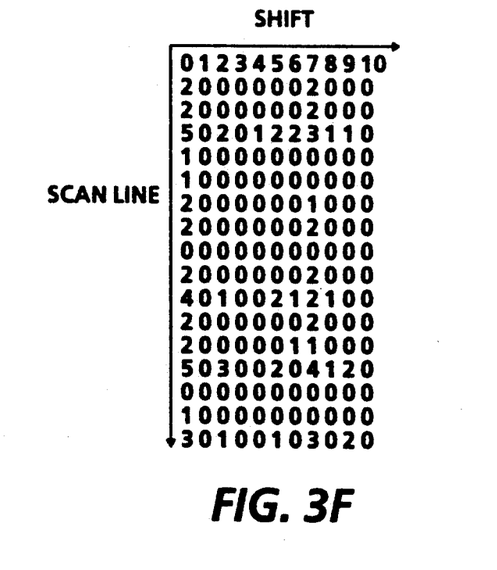

In accordance with another aspect of the invention, color halftones are usually a superposition of halftones in each separation at slightly differing angles. Using the plot similar to that shown in FIG. 3C for a monochrome reproduction of a multicolor image, resulting from treatment of the image data as described for FIGS. 3A and 3B, it is first noted at FIG. 3E, that the patterns of color halftones scanned by a monochrome scanner do not have the regularity of monochrome images at 45 degree angles. A sample plot in FIGS. 3D, 3E, and 3F, shows that the offset of non-zero entries of the auto correlation varies from scan line to scan line. However, it can also be noted in FIG. 3F that the zero position offset entries of the auto correlation are mostly non-zero, while in the monochrome case (FIG. 3C), the zero offset is marked by two or more zeros in the vertical direction. This feature can be used to distinguish high frequency color halftones from low frequency 45 degree halftones.

Figure 4A:
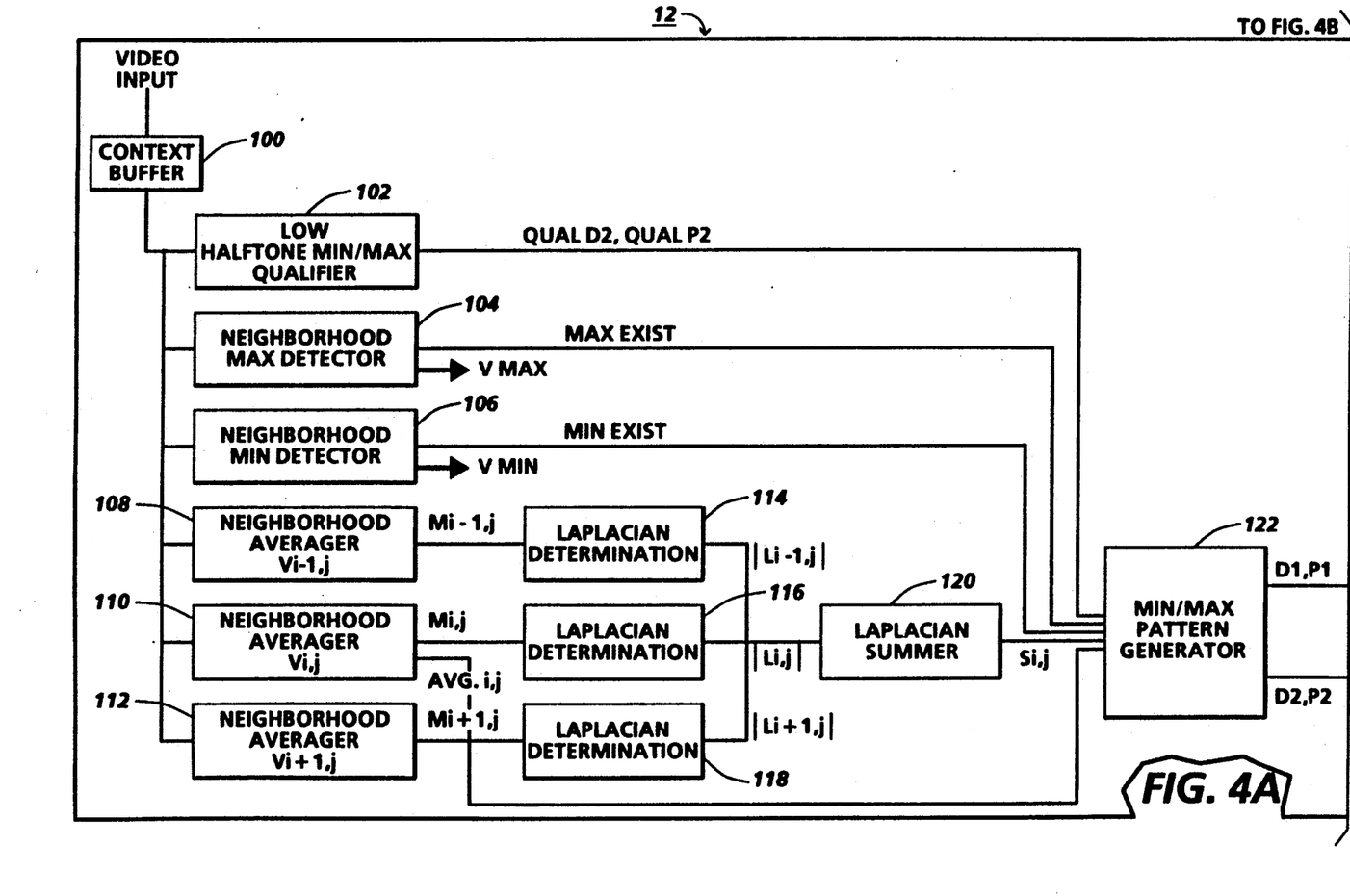
FIGS. 4A and 4B shows a block diagram of one possible embodiment implementing various aspects of the present invention.
Figure 4B:
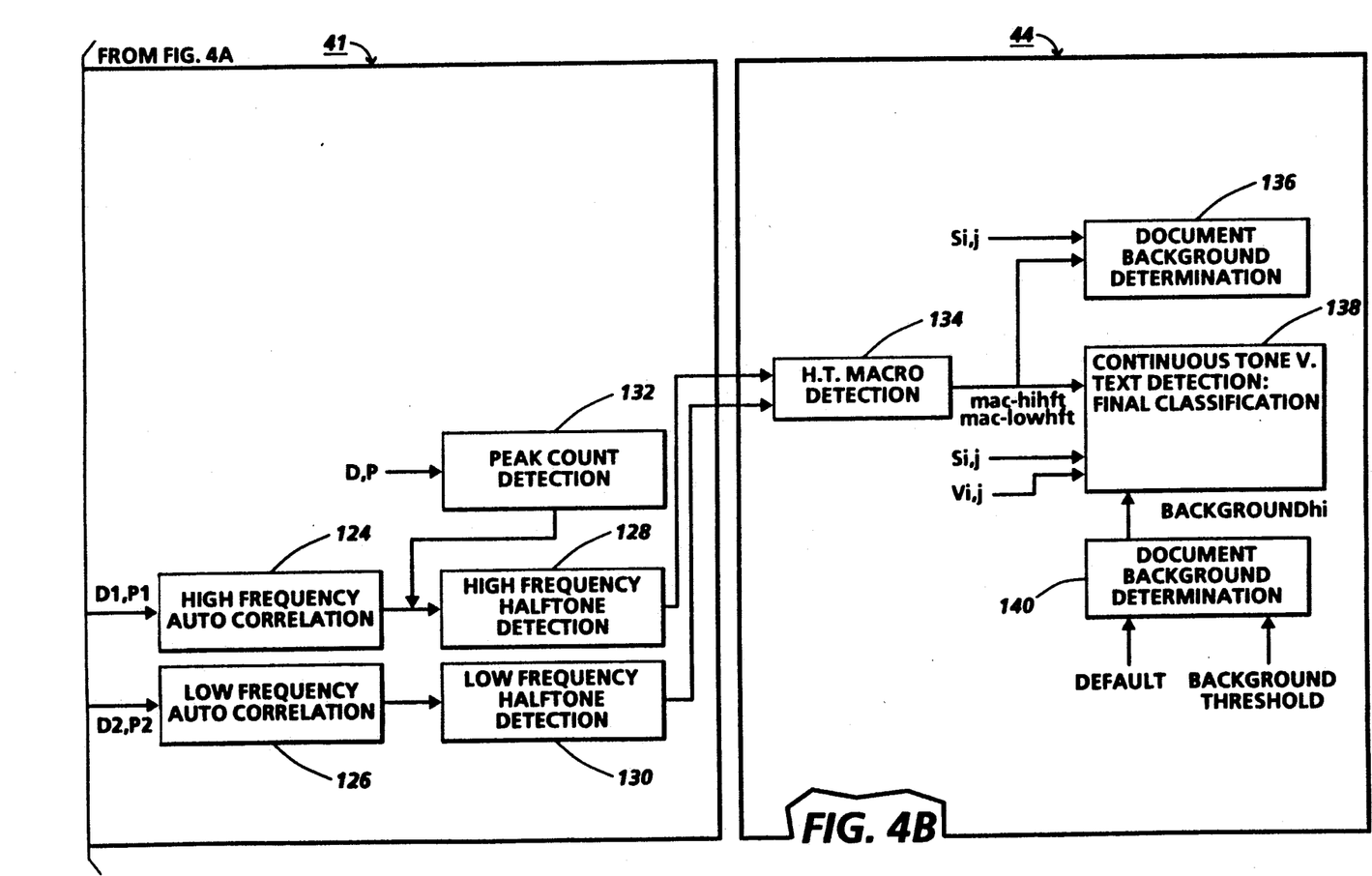

With reference now to FIG. 4, wherein a block diagram of one possible embodiment of a halftone detection arrangement in accordance with the invention is shown, video input is initially delivered to a context buffer 100, which for a pixel $V_{i,j}$ under consideration, stores a 5×5 matrix of pixel values centered on pixel $V_{i,j}$. The values are initially directed to low frequency halftone min/max qualifier 102, which is directed to confirming, for low frequency halftones, that the center pixel $V_{i,j}$ has a value either lower or higher than the neighboring pixels. The output flags of qualifier 102, QualD2 and QualP2, are used to qualify the decision to set the pattern bits D2 and P2 for low frequency halftones. The four neighbors in a 3×3 kernel centered on $V_{i,j}$, which are directly above, below and to the right and left of the pixel $V_{i,j}$ are compared with the four neighbors in the expanded 5×5 kernel which are directly above, below and to the right and left of these neighbors. The flag, QualP2, is set if the neighbors in the 3×3 kernel are greater than or equal to the neighbors in the 5×5 context (insuring the pixel $V_{i,j}$ is a peak). The flag, QualD2, is set if the neighbors in the 3×3 kernel are less than or equal to the neighbors in the 5×5 context (insuring the pixel $V_{i,j}$ is a valley).

Image signals are also directed from context buffer 100 to neighbor maximum detector 104 and neighborhood minimum detector 106, which respectively detect whether pixel $V_{i,j}$ is a maximum or minimum with respect to its neighbors. In the neighbor maximum detector 104, a determination is made whether the gray level value of the center pixel being processed, $V_{i,j}$, is greater than the values of its eight neighbors. This is accomplished by successively comparing two pixels at a series of comparators which produces outputs indicative of the neighborhood maximum $V_{max}$. Once the maximum video value $V_{max}$ within the eight neighbors is found, it is compared to the center pixel, $V_{i,j}$. If $V_{i,j}$ is greater than this maximum value then a flag, MaxExist, is set. This is repeated for each pixel in the scan line. The neighbor minimum detector 106, operates in essentially the same manner, except that the determination tests whether the pixel, $V_{i,j}$, has the smallest gray value when compared to its eight neighbors, $V_{min}$. If $V_{i,j}$ is the minimum value in a 3×3 kernel then a flag, MinExist, is set. This is repeated for each pixel in the scan line. The two flags, MaxExist and MinExist, will be used in the min/max pattern generator, as well as in the generation of the halftone micro detection flags, as will be explained further below.

Neighborhood averagers 108, 110 and 112 sum and average the eight neighbors of center pixel $V_{i,j}$. Each averager respectively derives average values $M_{i-1,j}$, $M_{i,j}$, $M_{i+1,j}$, for locations Vi,j, Vi−1,j and Vi+1,j, by summing the values of the 8 neighbors, and subsequently dropping the three least significant bits. This average value is used to determine both a Laplacian sum, as will be described hereafter, as well as the $D_1$, $D_2$, $P_1$, and $P_2$ pattern bits. The three averages are used to compute the Laplacian sums needed for context when computing the Laplacian Sum, $S_{i,j}$. The average of $V_{i,j}$ and its neighbors, termed, $Avg_{i,j}$ is also derived.

The absolute value of the Laplacian is found by subtracting the center pixel from the average of its eight neighbors, $M_{i,j}$ and taking the two's complement of the result if it is negative. ($|L_{i,j}| = |M_{i,j} - V_{i,j}|$). The absolute Laplacian values are determined at block 114 (operating on $M_{i-1}$), 116 (operating on $M_i$) and 118 (operating on $M_{i+1}$). The absolute Laplacian values are then summed at Laplacian summer 120. The absolute value of the Laplacian for $V_{i,j}$ and each of its eight neighbors is summed together and termed $S_{i,j}$. This value is used as a discriminator for text and continuous tone. Image areas which are determined not to be halftones, having video near background or black, and having a high Laplacian sums are classified as text. Otherwise, those image portions are classified as continuous tone.

Min/max pattern generator 122 determines if the following relationships are true: $S_{i,j} \geq$ NoiseSum, $(V_{i,j} -$ LowNoise$) > M_{i,j}$, $(V_{i,j} -$ HighNoise$) > M_{i,j}$, $(V_{i,j} +$ LowNoise$) < M_{i,j}$ and $(V_{i,j} +$ HighNoise$) < M_{i,j}$. The noise values are programmed values as previously described. The results of these tests, the flags MinExist and MaxExist, and the low frequency qualifiers QualD$_2$ and QualP$_2$, are used to set the maximum pattern bits P$_2$, P$_1$, and minimum pattern bits D$_2$, D$_1$, which represent the maxima and minima functions which will be subjected to the auto correlation function. P$_1$ and P$_2$ represent peaks of the signal while D$_1$ and D$_2$ represent valleys of the signal. The auto correlation function is then applied to the data signals D$_1$ and P$_1$ at high frequency halftone auto correlator 124. The auto correlation function operates on either D$_1$ or P$_1$, depending on a flag D/P generated at low frequency auto correlator 126, as to whether the average value of pixel $V_{i,j}$ and Avg$_{i,j}$ over the auto correlation block is greater than a reference value representing a mid-tone value, which represents whether the image is relatively dark or light. At high frequency auto correlator 124, the auto correlation function for testing the presence of high frequency halftones is applied to obtain results for pixel shift positions 2, 3, 4, 5 and 6.

Low frequency auto correlator 126 is essentially the same as high frequency auto correlator 124 with the exception that the D2 and P2 bit patterns are used from min/max pattern generator 122. There is also a longer shift register for the D2 and P2 bits since more auto correlation shift positions are examined for low frequency halftones. The auto correlation function for testing the presence of low frequency halftone is applied to obtain results for shift positions 4, 5, 6, 7, 8, 9 and 10. In addition, the previously mentioned flag, D/P, is generated in this module for use in both high and low frequency auto correlation modules as well as the peak count storage module.

The values for each of the shift positions derived by auto correlation of the min/max function are directed to high frequency halftone detector 128. Auto correlation values of adjacent shift positions are summed and compared to a programmable threshold. If any one of the sums is greater than or equal to this threshold and if there were both a minimum and maximum found within the auto correlation block, then a flag indicating high frequency halftones is set, indicating the presence thereof. If all the auto correlation values are equal to zero then the micro detection flag is reset to zero. Low frequency halftone detector 130 operates similarly.

Input video at 300 spi resolution represents a special case for the micro detection flag generation. For 300 spi shift positions 4 and 5 are not used to determine the presence of high frequency halftones but are used to detect low frequency halftones.

Where the auto correlation function may fail to indicate the presence of high frequency halftones, i.e. for color halftones, the peak count from the peak counter and storage 132 is used. The peak count value represents the number of peaks in a given block of auto ocrrelated pixels, accumulated over a fixed number of scan lines. This value is compared with two thresholds with typical values of 14 and 5. If the peak count value is greater than or equal to the higher threshold then the detection flag, for high frequency halftones, is set. If the peak count value is between the two thresholds then the flag for low frequency halftones is set.

Figure 5A:
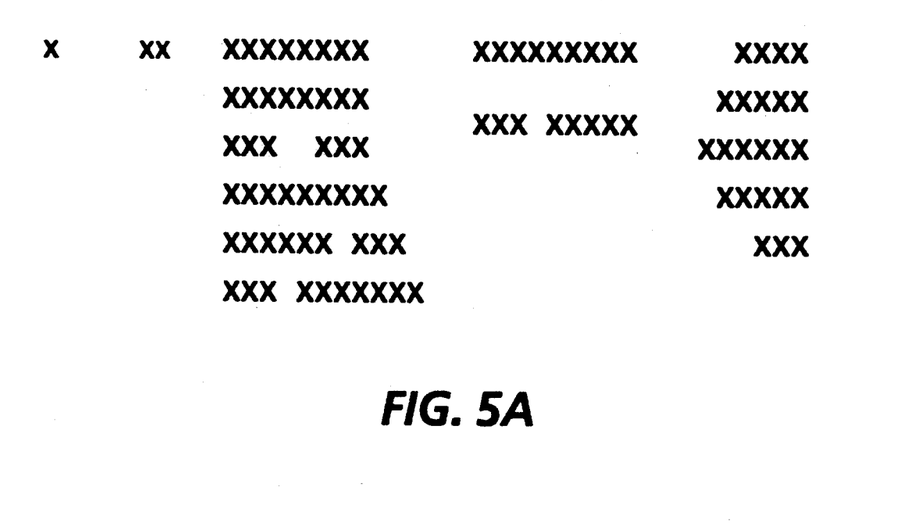
Figure 5B:
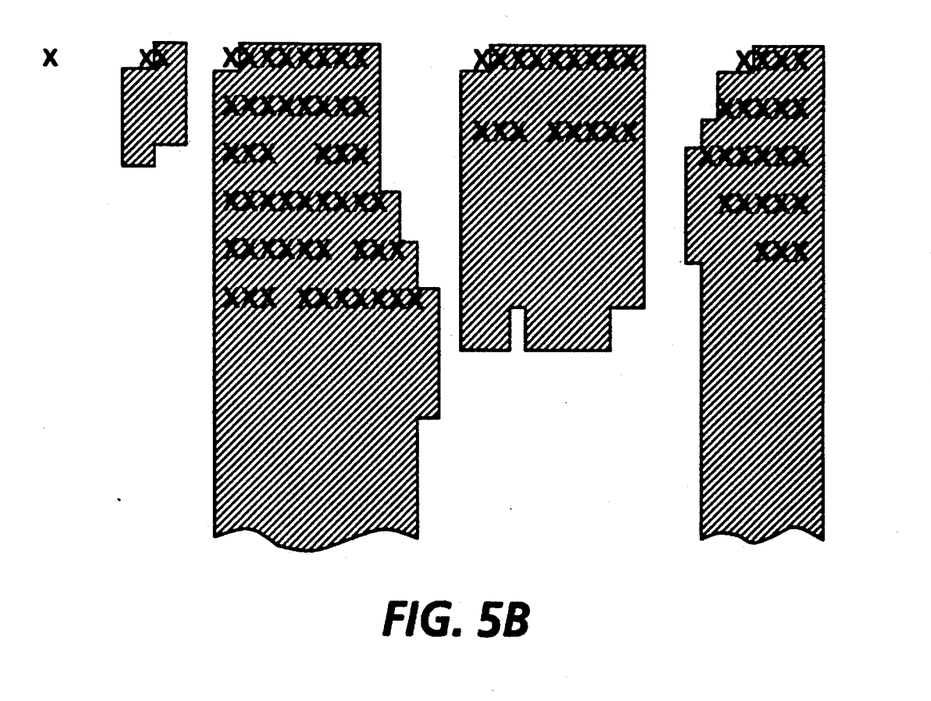
FIG. 5B shows the same image portions connected with macro detection.
Figure 6:
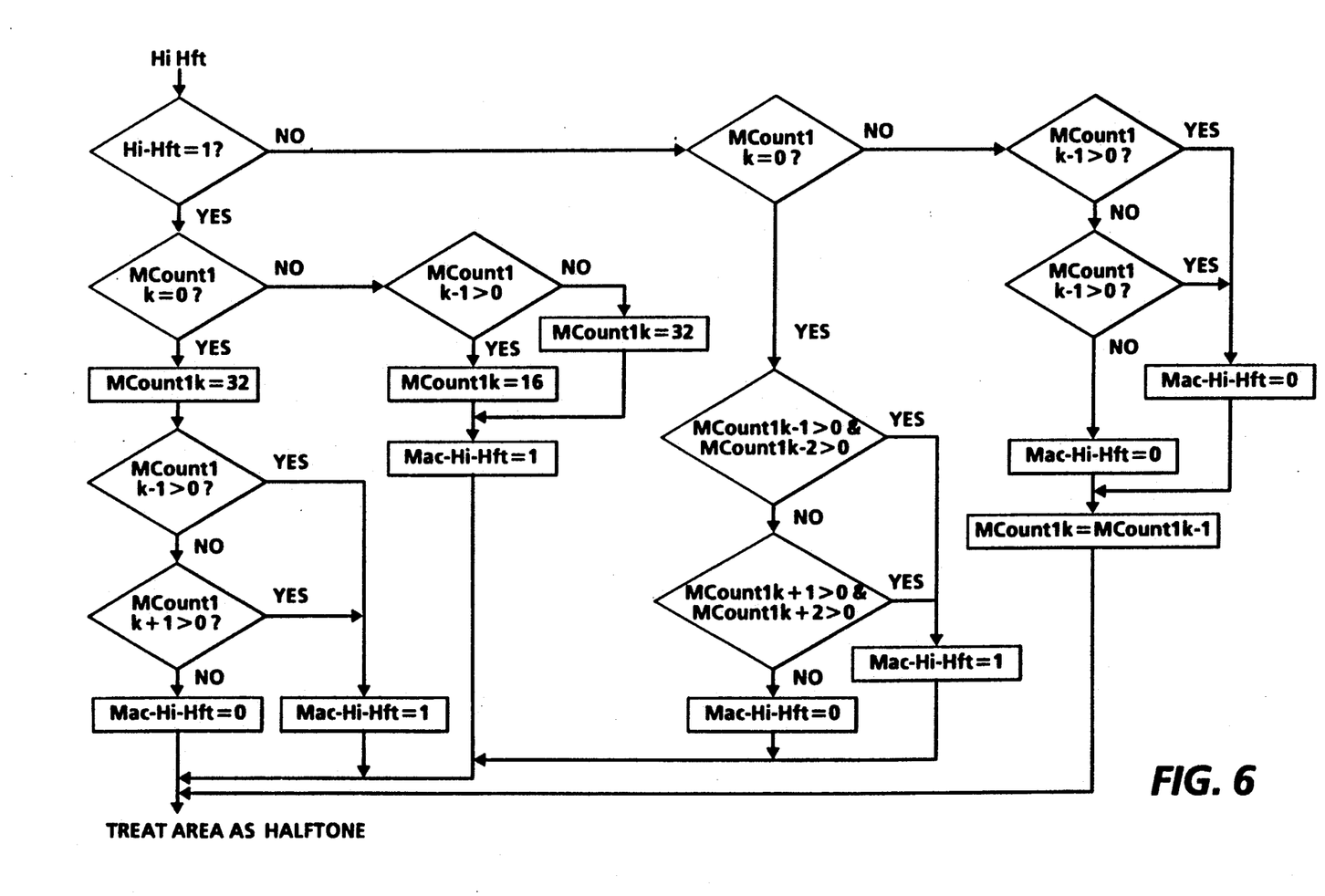
FIG. 6 shows a flow chart demonstrating the process of macro detection.

With reference now to FIG. 2, where the microdetection method described only establishes discrete spans of detected halftones, and detects only halftones where the peak or valley of a halftone dot exists, these spans now need to be connected together into a continuous regions or area of halftones (compare microdetected halftones at FIGS. 5A and regions to be treated as halftones in FIG. 5B). This is a function of the macrodetector 44. With reference again to FIG. 4, the detected status of the block of auto correlated pixels, directed from the halftone microdetectors 128 and 130 to the halftone macro detector 134 is used to modify a set of counters in a memory, to establish a detection history. The number of previously microdetected halftones varies a weighting factor that is applied to the current detection of halftone. Detections of high frequency halftone and low frequency halftones are counted from the detection signals directed to halftone macrodetector 134 from halftone micro detectors 128 and 130. In the particular embodiment, the neighborhood of consideration is defined as the previous two blocks in the scanline currently processed, the block directly above the current block in the previous scanline and the two blocks to the right of the current block in the previous scanline. A combination of the detection results from the microdetection, the value of the block directly above the current block in the prior scanline, and the values of neighboring blocks determine the outcome of the macro detection level. In some the cases where the microdetection fails to indicate halftones due perhaps to extremes in halftone density range of the image, neighborhood information is used to determine the outcome of the micro detection level. This logic allows spanning of an area within a halftone pictorial that was not detected on the micro level. These counters, MCount1k, MCount1k−1, MCount1k−2, MCount1k+1, MCount1k+2, for each of the five auto correlated blocks, which as reviewed, provide context to determine whether a microdetected halftone span should actually be classified as halftone in the final output. A high output flag, mac-hi-hft (for high frequency halftone areas) or mac-low-hft (for low frequency halftones), is generated so long as the region should be classified as either a high or low frequency halftone based on the context of microdetections. The flow chart in FIG. 6 shows the decision process of the macro detection for the high frequency halftone. If a block of pixel is detected as high frequency halftone by the high frequency halftone detection block 128 for the first time as indicated by a zero history counter, the history counter is set to a high value, typically 32 for 400 scanlines per inch. The macro detection flag, mac-hi-hft, is set, only if one of the immediate neighboring blocks has a non-zero history count. This prevents an isolated false micro detection from being flagged as a macro detection. If the history counter of the current micro detected block is non zero, the mac-hi-hft flag is set. The counter is reset back to 32, if it is greater than 16 and set to 16 otherwise.

If the current block is not detected as high frequency halftone, yet its history counter is non-zero, indicating detection in the same block position of the previous scanlines, the adjacent blocks are then checked. If either of them also has non-zero count, the mac-hi-hft flag is set. This tends to fill up the block of undetected halftone inside those already detected. The history counter of the block is decreased by one so that unless further micro detection occurs in the same block in the subsequent scanlines, the block will not be classified as halftone after several scanlines. If the history counter of the undetected block is zero, the mac-hi-hft flag will not be set unless the previous two blocks or the next two blocks have non-zero history count.

The macro detection for the low frequency halftone is the same as the high frequency halftone with a different set of history counters. The macro detection process has the effect of merging the discrete micro detected blocks of pixel into continuous region of macro detected region as shown in FIGS. 5A and 5B. The extra macro detected region on both sides and below the actual halftone area can be re-classified in the final classification block 138.

For pixels in blocks not classified as halftones by the halftone micro detection, additional steps of classification into continuous tone or text/line art at block 138 is necessary. Background areas, identified at document background determination 140 are treated as belonging to text/line art, because the background and embedded text are best reproduced by simple thresholding. Text areas are characterized by pixels of low video levels corresponding to the black text and high video levels corresponding to the white background, connected by gray pixels that have high value of Laplacian sum at the edge of the text. In contrast to text, gray pixels inside a continuous tone picture, with the exception of textured area and high contrast edges, usually have a low value of Laplacian sum. The classification of text/line art versus continuous tone pixels thus could be done pixel by pixel, based on pixel $V_{i,j}$ as well as the absolute Laplacian sum which is already computed for each pixel. In order to avoid classifying a dark area, a highly textured area or a high contrast edge inside a continuous tone picture as text, image run discriminator 136 is provided. An image run is defined as a continuous sequence of non-background pixels that have either small Laplacian sums, or are inside either a high frequency halftone block or an image run determined from the previous scanline. These image runs are represented by the beginning and ending pixel indices and are stored in appropriate memory.

We assume an average background value is available from a windowed region near the leading edge of the document. Once we have determined the background video value of the document being scanned, we determine two fractions of this value termed, White1 and White2. These fractions are programmable by the user, with typical values of 90% for White1 and 82% for White2. These values are used to qualify pixels as background, i.e. text, later.

Blocks that have been classified as halftones will be checked to see if they contain background pixels. If the Laplacian Sum, $S_{i,j}$, of a pixel is small and its video $\geq$ White 1, then the pixel is probably background and will be classified as text instead of halftone. This helps clean up borders of halftone images as well as regions extending below actual halftone by the macro detection.

Next, we examine the pixels that are not in blocks classified as halftone. If the pixel is not in an image run and its Laplacian Sum, $S_{i,j}$, is greater than or equal to a given threshold, with typical value of 60, then the pixel is probably part of a line or character and is classified as text. If not, we then compare the pixel against the second, smaller fraction of the background value, White2, to test for background around text. If the pixel value is greater than or equal to White2 and it is not inside an image run, then it is classified as text background. If it is inside an image run, then it will not be classified as text background unless it is greater than or equal to the higher threshold White 1. For those pixels with video less than White2, i.e. gray or black pixels, we classify as black text those pixels that are not in an image run and with video less than a black threshold, with typical value of 50. The black pixels that are inside an image run and all gray pixels, except those with a high Laplacian sum and outside of an image run, i.e. the edges of text, will be classified as continuous tone.

The text and continuous tone classifications require the knowledge of the video corresponding to the background level of the document. This background value is obtained at document background determination 140 from a running average of pixels inside a suitably specified window near the leading edge of the document. Before this value becomes available, a background default value is used. In determining the running average, it is also better to exclude pixels with video less than a certain level specified by a background threshold level. At the end of the window, the running average of background is checked against the lower bound, and the default value is used, if the running average is smaller than the lower bound. The background value provides the information necessary for text and continuous tone classification at block 138, by providing the indication background to that function.

The step involving the comparison of the absolute Laplacian sum of the pixel with its reference value can be substituted by comparing the absolute value of the output of a high pass filter, such as the difference between the center pixel and the average of its 5 by 7 neighbors with a referenced value.

The system has been illustrated with the pixel value 0 being black and pixel value 255 being white for an 8 bit video value. The description remains valid, with the appropriate changes of the inequality in comparing the pixel values with references, for a system where 0 is white and 255 is black.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. A method of processing image pixels in an electronic document image to determine the presence of halftone images, for optimum image processing thereof preparatory to printing the document, the steps comprising:

at an document image data buffer, receiving a document image defined by a plurality of pixels, each pixel a signal representing an optical density of the document at a discrete location therewithin and storing it in said document image data buffer;

with a comparison circuit operatively connected to said document image data buffer and having as inputs each pixel in a predetermined neighborhood thereof comparing said pixel to a group of neighboring pixels to determine whether it is a local area minimum or maximum and producing a local area minimum or maximum signal indicative thereof;

with a signal generator circuit responsive to said minimum or maximum signal, generating two image signals, a first image signal representing local area maximums of the image, and a second image signal representing local area minimums of the image;

with an averaging circuit having as input the image defined by a plurality of pixels, measuring optical density of the image over a block of T pixels with respect to a reference, and producing an average optical density signal indicative of the measured optical density;

with an auto correlation circuit having as inputs the first and second image signal, and operating on in response to the average optical density signal, auto correlating the first image signal if the average optical density signal is relatively high with respect to the reference, or auto correlating the second image signal if the average optical density signal is relatively low with respect to the reference, the auto correlation function evaluated over the block of T pixels, and for each of a plurality of offset values selected as corresponding to probable halftone frequencies;

from the auto correlated function, detecting for each offset value for which the auto correlation function was evaluated, whether the result of the evaluation is a zero or non-zero value, the presence of a non-zero value indicating the presence of halftone images at the frequency corresponding to the offset value; and with an output signal generator, directing an output signal indicative of the presences of halftone images at the frequency corresponding to the offset value to an image processing control, to control the manner in which image pixels are processed when halftone images are detected.

2. The method as defined in claim 1, wherein the auto correlation function A(n) is given by:

$$A(n) = \sum_{t=0}^{T} p(t) \times p(t + n)$$

where n is a selected offset of the auto correlation function;
p is the pixel value; and
t=a pixel position in the block of T pixels selected.

3. The method as defined in claim 1, wherein the auto correlation function Φ(h) is given by:

$$\Phi(k) = \sum_{t=1}^{T} |f(t) - f(t + k)|;$$

where k is a selected offset value at which the function is evaluated;
f(l) is the pixel value; and
ti is a selected pixel position in the block of T pixels.

4. The method as defined in claim 1, where each pixel in the first image signal representing local area maximums of the image, and a second image signal representing local area minimums of the image are each represented by a one bit per pixel function.

5. The method as defined in claim 4, wherein, the auto correlation function is given by:

$$A(n) = \sum_{t=0}^{T} p(t) \wedge p(t + n)$$

where n is selected offset of the auto correlation function;
p is the pixel value;
t is a pixel position in the block of T pixels selected; and
∧ is a logical AND function.

6. The method as defined in claim 1, wherein in the determination of local area minimum, to be determined a minimum, a pixel must be at less than other pixels in the local area by a preselected amount.

7. The method as defined in claim 1, wherein the determination of local area maximum, to be determined a maximum, a pixel must be at greater than other pixels in the local area by a preselected amount.

8. The method as defined in claim 1, wherein in the determination of local area, the local area includes the closest eight neighboring pixels.

9. The method as defined in claim 1, wherein the determination of image density over the block of pixels is made by keeping a running average of pixel values in the block, and for each pixel determining whether the the running average is greater than or less than a density reference.

10. A method of processing image pixels in an electronic document image to determine the presence of halftone images therein, for optimum image processing preparatory to printing the document, the steps comprising:

at a document image data buffer, receiving an image defined by a plurality of pixels, each pixel representing an optical density of the document at a discrete location therewithin and storing it is said document image data buffer;

with a comparison circuit operatively connected to said document image data buffer and having as inputs each pixel in a predetermined neighborhood thereof comparing said pixel to a preselected group of neighbors to determine whether it is a local area minimum or maximum, and producing a local area minimum or maximum signal indicative thereof;

with a signal generator circuit responsive to said minimum or maximum signal, generating two image signals, a first image signal representing local area maximums of the image, and a second image signal representing local area minimums of the image;

with an auto correlation circuit having as inputs the first and second image signal, for each pixel in a block of T pixels, evaluating auto correlation function A(n) at a plurality of offset values n, given by;

$$A(n) = \sum_{t=0}^{T} p(t) \times p(t+n)$$

where
n is a selected offset of the auto correlation function,
p is the pixel value, and
t = a pixel position in the block of T pixels selected; and with a zero detecting circuit operatively connected to said auto correlation circuit, from signal A(n), detecting for each offset value whether the result of the auto correlation function evaluation is a zero or non-zero value, the presence of a non-zero value indicating the presence of halftone images at the frequency corresponding to the offset value; and with an output signal generator, directing an output signal indicative of the presences of halftone images at the frequency corresponding to the offset value to an image processing control, to control the manner in which image pixels are processed when halftone images are detected.

11. A method of processing image pixels in an electronic document image represented by a plurality of scan lines of pixels, to determine the presence of color halftones or rotated halftones in the image, for optimum image processing of colored halftones preparatory to printing the document, the steps comprising:

at an document image data buffer, receiving an image defined by a plurality of pixels, each pixel representing the optical density of a document image at a discrete location therewithin and storing it in said document image data buffer;

with a comparison circuit operatively connected to said document image data buffer and having as inputs each pixel in a predetermined neighborhood thereof comparing said pixel to a group of neighboring pixels to determine whether it is a local area minimum or maximum, and producing a local area minimum or maximum signal indicative thereof;

with a signal generator circuit responsive to said minimum or maximum signal, generating two image signals, a first image signal representing local area maximums of the image, and a second image signal representing local area minimums of the image;

with an averaging circuit having as an input the image defined by a plurality of pixels, measuring optical density over a block of T pixels with respect to a reference density;

with an auto correlation circuit having as inputs the first and second image signal, and operating on in response to the average optical density signal, for each block of T pixels, auto correlating the first image signal if the average optical density signal is relatively high with respect to the reference density, or auto correlating the second image signal if the average optical density signal is relatively low with respect to the reference density, the auto correlation function evaluated over the block of T pixels, and for each of a plurality of offset values including n=0 selected as corresponding to probable halftone frequencies, the determination of image density with respect to a reference made over the block of pixels;

with a zero detector circuit, from the auto correlated image signal, detecting for the offset value n=0 whether the result of the auto correlation evaluation is a zero or non-zero value;

with a counter circuit, counting the number of non-zero values for each block of T pixels over a group of scan lines, and upon exceeding a predetermined threshold indicative of the presence of color halftones or rotated halftones in the image, producing a color halftone presence signal thereof; and with an output signal generator and responsive to the color halftone presence signal, directing an output signal indicative of the presences of color halftones or rotated halftone images to an image processing control, controlling the manner in which image pixels are processed when halftone images are detected.

12. Apparatus for processing image pixels in an electronic document image represented by a plurality of scan lines of pixels, to determine the presence of halftones in the image, for optimum image processing preparatory to printing a document comprising:

a document image data buffer, suitable for storing an image defined by a plurality of pixels, each pixel a signal representing the optical density of a document image at a discrete location therewithin;

a comparison circuit operatively connected to said document image data buffer and having as inputs each pixel in a predetermined neighborhood thereof, said circuit comparing each pixel with a group of neighboring pixels to determine whether it is a local area minimum or maximum, and provide an output signal indicative thereof;

a signal forming circuit forming a minimum signal and maximum signal each representing the set of minimum pixels and the set of maximum pixels within the image;

an averaging circuit having as an input signal the image defined by a plurality of pixels, measuring average optical density of the image over a block of T pixels and producing an average optical density signal;

thresholding means operable on the average optical density signal of a block of T pixels in the image, for determining whether the image is relatively dark or light, and producing a dark signal if the average value is less than a threshold value and a light signal if the average value is greater than the threshold value;

an auto correlation circuit having as inputs the first and second image signal from said signal forming means, and operating on a selected one of said signal responsive to the dark and light signals for evaluating the auto correlation function for each block of T pixels, said auto correlation means operable on the maximum signal if the image has been determined to be dark, and operable on the second function if the image has been determined to be light, the auto correlation function evaluated over the block of T pixels, and for each of a plurality of offset values selected as corresponding to probable halftone frequencies;

an offset comparison means for determining from said auto correlation circuit whether the evaluation at each offset value is a non-zero value, and producing an offset comparison signal indicating the presences of halftone at the corresponding halftone frequency, an output signal generator, responsive to said offset comparison signal and directing an output signal indicative of the presences of halftone images at the frequency corresponding to the offset value, to an image processing control, to control the manner in which image pixels are processed when halftone images are detected.

13. The apparatus as defined in claim 12, where the maximum signal and the minimum signal are each represented by a one bit per pixel function.

14. The apparatus as defined in claim 13, wherein, the auto correlation function is given by:

$$A(n) = \sum_{t=0}^{T} p(t) \wedge p(t+n)$$

where
n is a selected offset of the auto correlation function;
p is the pixel value, equal to 1 if the pixel is a minimum or maximum, else equal to 0;
t is a pixel position in the block of T pixels selected; and
$\wedge$ is a logical AND function.

15. A method of controlling an image processing circuit by distinguishing in an image within an electronic document to be processed thereby, portions thereof classifiable as halftone image portions and background image portions for optimum image processing preparatory to printing the document, comprising the steps of:

at a document image data buffer, receiving an electronic document image defined by a plurality of pixels, each pixel an electronic signal representing an optical density of the document at a discrete location therewithin, and storing said electronic document image in said document image data buffer;

with an image processing circuit, operatively connected to said document image data buffer, receiving and processing an electronic document image with a plurality of image type specific processing circuits preparatory to printing, at least one of said image type specific processing circuits optimally processing continuous tone or line/text images, and producing processed image signals as an output;

directing the output of each image type specific processing circuit to a data bus;

operating an image averaging circuit having as an input the electronic document image stored in the document image data buffer, to generate an image average background signal for the image;

with a halftone detection circuit, connected to said document image data buffer and having as inputs each electronic signal in a portion of the stored electronic document image, determining portions of the image to be treated as including halftone images and producing a halftone presence signal indicative thereof;

operating a neighborhood averaging circuit, having as an input the electronic document image and determining for each pixel the average value of its neighboring pixels responsive to the halftone detection signal;

operating a Laplacian calculating circuit, having as a signal input said neighborhood average signal and a corresponding pixel and subtracting the value of the pixel electronic signal, from the neighborhood average signal, and producing a Laplacian signal as a circuit response, and for a negative value so determined, determining two's complement of the negative value thereby determining the absolute value of the Laplacian of the pixel;

operating a summing circuit, having as signal inputs the absolute value of the Laplacian sum for each pixel, and its neighboring pixels, and comparing the absolute value signal produced at the summing circuit to a predetermined reference signal selected to discriminate between halftone image portions and text background image portions;

comparing the pixel to a predetermined fraction of the average background signal of the image;

with an output signal generator, producing an output signal indicative of background image portions in accordance with the comparison of the absolute value signal with the reference signal, and in accordance with the comparison of the pixel with the predetermined fraction of the background value to an image processing bus controller, to limit access to the data bus for image signals from image type image processing circuits optimally processing for printing.

16. A method of controlling an image processing circuit by determining the presence within an electronic document image to be processed thereby of portions thereof classifiable as continuous tone or line/text images, for optimum image processing preparatory to printing the document, comprising the steps of:

at a document image data buffer, receiving an electronic document image defined by a plurality of pixels, each pixel an electronic signal representing an optical density of the document at a discrete location therewithin and storing it in said document image data buffer;

with an image processing circuit, operatively connected to said document image data buffer, receiving and processing electronic document image with a plurality of image type specific processing circuits preparatory to printing, at least one of said image type specific processing circuits optimally processing continuous tone or line/text images, and producing processed image signals as an output;

directing the output of each image type specific processing circuit to a data bus in accordance with an image type signal received at a bus controller;

with a halftone detection circuit, operatively connected to said document image data buffer and having as inputs each electronic signal in a predetermined neighborhood of pixels, determining that an image portion does not include halftones, and producing a halftone absence signal indicative thereof;

operating an averaging circuit having as signal inputs the image portion and responsive to the halftone absence signals, generating a neighborhood average signal for each pixel in the image portion;

operating a Laplacian calculating circuit, having as a signal input said neighborhood average signal and said pixel electronic signal and, subtracting the value of the pixel electronic signal, from the neighborhood average signal, and producing a Laplacian signal as a circuit response, and for a negative value so determined, determining two's complement of the negative value thereby determining the absolute value of the Laplacian of the pixel;

operating a summing circuit having as signal inputs the signal from the Laplacian calculating circuit, summing the Laplacian signals generated for each pixel, and its neighboring pixels, and comparing said result to a predetermined reference signal selected to discriminate between continuous tone image portions and text/line image portions;

with an output signal generator, producing an output signal indicative of continuous tone image portions or text/line portions in accordance with the comparison of the Laplacian sum and the reference signal to an image processing bus controller, to limit access to the data bus for image signals from image type image processing circuits optimally processing continuous tone or line/text images when continuous tone image portions or text/line portions images are detected, for printing.

17. A method of controlling an image processor for optimum image processing preparatory to printing a document by determining the presence within an electronic document image of portions thereof classifiable as line/text, continuous tone, or background, wherein pixel values range from a minimum value representing a black pixel and a maximum value representing a white pixel, comprising the steps of:

at a document image data buffer, receiving an electronic document image defined by a plurality of pixels, each pixel representing an optical density of a document image at a discrete location therewithin and storing it in said document image data buffer;

with an image processing circuit, operatively connected to said document image data buffer, receiving and processing electronic document image with a plurality of image type specific processing circuits preparatory to printing, at least one of said image type specific processing circuits optimally processing continuous tone or line/text images, and producing processed image signals as an output;

directing the output of each image type specific processing circuit to a data bus;

with an averaging circuit having as an input the image, determining from the stored electronic document in the document image data buffer an average background value for the image, and producing an average background signal indicative thereof;

responsive to the average background signal, producing first and second fractional average background signals of the average background signal, with the first value being greater than the second one;

operating a halftone detection circuit to determine those portions of the image including halftones, and producing a halftone detection signal indicative thereof;

operating an absolute Laplacian summing circuit, receiving as inputs pixels in the image with a predetermined spatial relationship with a pixel to be processed, and producing an absolute Laplacian sum signal;

with an image run detector, receiving as inputs said halftone detection signal determining for each scanline in the image whether the scan line is in a portion of the image classifiable as an image run, and storing the location of each image runs in an image run location buffer, each image run including a continuous sequence of pixels, wherein each pixel in the image run may be classified into at least one of three classifications wherein pixels in the first class have a pixel value with a predetermined relationship with the average background value and absolute Laplacian sum, pixels in the second class includes pixels that are inside a portion of the image classified as including halftones and pixels of the third class include pixels that are located inside an image run of the preceding scanline;

at a background-continuous tone-line/text detection circuit, having as inputs the image run signal, the first and second fractional value background signals, a black reference signal and the absolute Laplacian sum signal, producing a control signal to the image processing circuit controlling the image processing of the electronic document image in accordance with a predetermined relationship of said background-continuous tone-line/text detection circuits inputs.

18. The method as defined in claim 17, wherein said predetermined relationship is defined as follows:

for each pixel, producing an indication of a line/text image portion, when the absolute Laplacian sum for the pixel is greater than the reference value and the pixel is not inside the image run of the previous scanline;

for each pixel, producing an indication of background image portion when the pixel value is greater than the second fractional value and the pixel is not inside an image run of the previous scanline;

for each pixel, producing an indication of background image portion when the pixel value is greater than the first fractional value and the pixel is inside an image run of the previous scanline;

for each pixel, producing an indication of continuous tone image portion when the pixel value is less than the first fractional value and the pixel is inside an image run of the previous scanline;

for each pixel, producing an indication of text/line image portion when the pixel value is less than a black reference value and the pixel is not inside an image run of the previous scanline; and for each pixel, producing an indication of continuous tone image portion when the pixel value is less than the second fractional value of background value and the pixel is either inside an image run or with pixel value greater than the black reference value.

19. The method as defined in claim 17, wherein said predetermined relationship is defined as follows:

for each pixel, producing an indication of background image portion when the pixel value is less than the second fractional value and the pixel is not inside an image run of the previous scanline;

for each pixel, producing an indication of background image portion when the pixel value is less than the first fractional value and the pixel is inside an image run of the previous scanline;

for each pixel, producing an indication of continuous tone image portion when the pixel value is greater than the first fractional value and the pixel is inside an image run of the previous scanline;

for each pixel, producing an indication of text/line image portion when the pixel value is greater than a black reference value and the pixel is not inside an image run of the previous scanline; and for each pixel, producing an indication of continuous tone image portion when the pixel value is greater than the second fractional value of background value and the pixel is either inside an image run or with pixel value greater than the black reference value.

20. The method as defined in claim 17, wherein said predetermined relationship is defined as follows:

for each pixel, producing an indication of a line/text image portion, when the high frequency image filter output for the pixel is greater than the reference value and the pixel is not inside the image run of the previous scanline;

for each pixel, producing an indication of background image portion when the pixel value is greater than the second fractional value and the pixel is not inside an image run of the previous scanline;

for each pixel, producing an indication of background image portion when the pixel value is greater than the first fractional value and the pixel is inside an image run of the previous scanline;

for each pixel, producing an indication of continuous tone image portion when the pixel value is less than the first fractional value and the pixel is inside an image run of the previous scanline;

for each pixel, producing an indication of text/line image portion when the pixel value is less than a black reference value and the pixel is not inside an image run of the previous scanline; and for each pixel, producing an indication of continuous tone image portion when the pixel value is less than the second fractional value of background value and the pixel is either inside an image run or with pixel value greater than the black reference value.

21. The method as defined in claim 17, wherein said predetermined relationship is defined as follows:

for each pixel, producing an indication of a line/text image portion, when the absolute value of a high frequency image filter output for the pixel is less than the reference value and the pixel is not inside the image run of the previous scanline;

for each pixel, producing an indication of background image portion when the pixel value is less than the second fractional value and the pixel is not inside an image run of the previous scanline;

for each pixel, producing an indication of background image portion when the pixel value is less than the first fractional value and the pixel is inside an image run of the previous scanline;

for each pixel, producing an indication of continuous tone image portion when the pixel value is greater than the first fractional value and the pixel is inside an image run of the previous scanline;

for each pixel, producing an indication of text/line image portion when the pixel value is greater than a black reference value and the pixel is not inside an image run of the previous scanline; and for each pixel, producing an indication of continuous tone image portion when the pixel value is greater than the second fractional value of background value and the pixel is either inside an image run or with pixel value greater than the black reference value.

* * * * *